United States Patent [19]

Nomoto et al.

[11] Patent Number: 4,509,061
[45] Date of Patent: Apr. 2, 1985

[54] METHOD AND APPARATUS FOR FORMING PHOTOGRAPHIC RECORD OF SOUND FIELD

[75] Inventors: Sadao Nomoto, Kamakura; Kazuyoshi Iida, Yokohama, both of Japan

[73] Assignee: Bridgestone Tire Company Limited, Tokyo, Japan

[21] Appl. No.: 537,610

[22] Filed: Sep. 30, 1983

[30] Foreign Application Priority Data

Oct. 1, 1982 [JP] Japan .................. 57-172698

[51] Int. Cl.$^3$ .................. G01D 9/42
[52] U.S. Cl. .................. 346/107 R; 352/5; 358/112; 346/1.1
[58] Field of Search ............ 346/107 R, 33 B, 33 EC, 346/108, 1.1; 358/112; 352/5

[56] References Cited

U.S. PATENT DOCUMENTS 1,822,057  9/1931  Owens ............................. 352/5
3,508,015  4/1970  Miller ........................ 346/107 R Primary Examiner—E. A. Goldberg
Assistant Examiner—M. J. Reinhart
Attorney, Agent, or Firm—Sughrue, Mion, Zinn, Macpeak and Seas

[57] ABSTRACT

Method and apparatus for forming a photographic record representing acoustic characteristics of a sound field such as the distribution of sound pressure and the distribution of equiphase surface wave are disclosed. A microphone and a light emitting diode are reciprocally moved to scan a plane in the sound field and an envelope signal of an output signal from the microphone is derived. The envelope signal is then sampled at a given sampling frequency to produce a sample signal. A carrier having a given frequency is amplitude-modulated with the sample signal to derive a modulated signal. Then, a switching circuit is controlled by the modulated signal in such a manner that when the envelope signal exceeds a predetermined value, the switching circuit is made on and off repeatedly and thus the light emitting diode is turned on and off at a rate of the carrier frequency to form a locas of the light spot. An image of the locus of the light spot is recorded optically on a photographic film.

14 Claims, 13 Drawing Figures

— Forward Scan
← Backward Scan

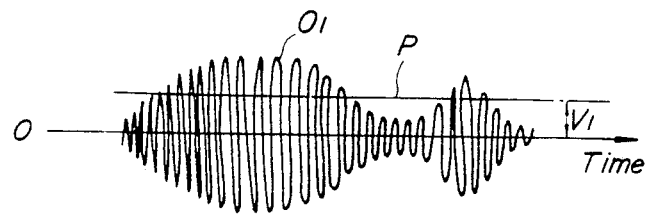
FIG._4A
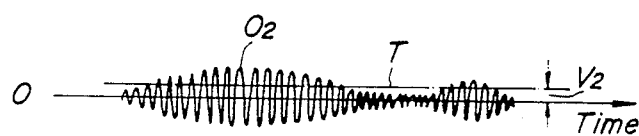
FIG._4B
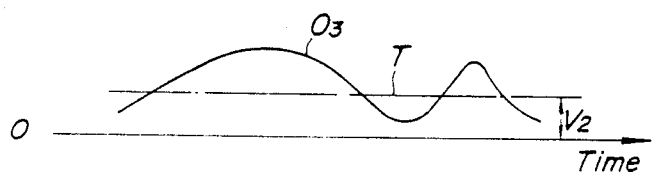
FIG._4C
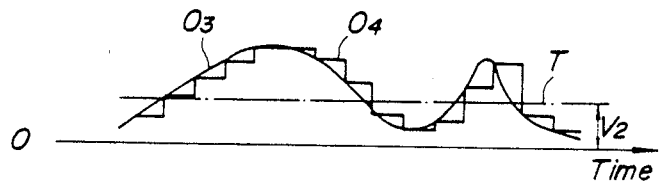
FIG._4D
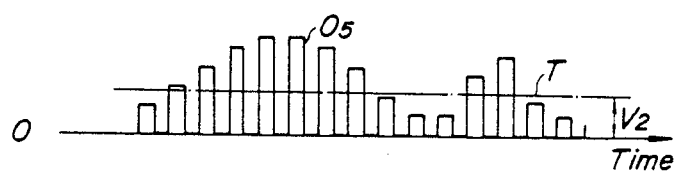
FIG._4E
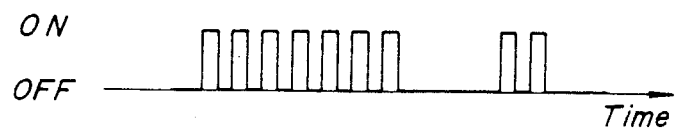
FIG._4F

METHOD AND APPARATUS FOR FORMING PHOTOGRAPHIC RECORD OF SOUND FIELD

BACKGROUND OF THE INVENTION

The present invention relates generally to a technique for investigating characteristics of an acoustic wave propagating through an acoustic field, and more particularly to a method and an apparatus for forming a photographic record representing acoustic characteristics such as distribution of sound pressure, spread of sound wave, and distribution of equiphase surface, of noisy sound generated from a noise source such as a rotating tire an in general, machines.

In order to take a photograph of a distribution of sound pressure in a sound field, there have been proposed various methods. In one of the known methods, a plane in the sound field is scanned continuously by means of a microphone secured to a scanning device to which is also arranged a light source such as a light emitting diode.

An output signal from the microphone is amplified and detected, and then a switching circuit is controlled by an output signal from the detector in such a manner that when the output signal exceeds a predetermined level corresponding to a given minimum sound pressure to be detected, the switching circuit is made conductive to turn on the light emitting diode to form a locus of light spot. An image of the locus of light spot thus formed is then recorded on a photographic film by means of a still camera whose shutter is remained opened during the scanning.

In such a known method of forming a photographic record of the sound field, the image formed on the film has no sharp boundary between bright and dark areas due to a hysterisis characteristic of the switching circuit. As shown in FIG. 1, when an output signal M from the detector exceeds a turn-on voltage level $E_{ON}$, the switching circuit is made conductive to ignite the light emitting diode. When the output signal M decreases below a turn-off voltage level $E_{OFF}$, the switching circuit is made non-conductive to turn-off the light source. Usually, the turn-on voltage level $E_{ON}$ is different from the turn-off voltage level $E_{OFF}$. Therefore, when the microphone and light emitting diode are reciprocally scanned, the light emitting diode is turned on or turned off during the backward scanning at positions slightly displaced by a distance d from positions at which the light emitting diode is turned off or turned on during the forward scanning, even if the output signal M from the microphone is not changed between the forward and backward scannings. In this manner, a boundary of the image recorded on the film lacks the sharpness. The above explained drawback may be obviated by scanning the sound field always in the same direction. But, in such a case, it is apparent that the scanning period would be prolonged to a great extent.

Further, in the known method, the scanning member for supporting the microphone and light source is moved continuously to effect a so-called continuous move system. In this case, the influence of noise contained in the output signal M of the microphone directly appears on the final photographic film, because the light intensity of light spot locus recorded on the film does not represent an average of instataneous sound pressures at respective scanning points, but represents instantaneous sound pressures at respective scanning points. Therefore, when noises n are superimposed on the output signal M, the light source is erroneously lighted on and the distribution of sound pressure could not be recorded accurately.

In order to obviate the above mentioned drawback, it may be considered that the microphone and light source are moved intermittently and sound pressures detected at respective points are averaged to remove the influence of noise. In this case, it will be very difficult to control a driving mechanism of the scanning device and a very long scanning time is required. Further, a light spot locus recorded on the film would not be continuous and thus, a sharp image could not be obtained. This drawback may be eliminated by reducing a distance between successive stop positions of the scanning device. However, in this case, the control of the scanning mechanism will be more difficult and the scanning will require much longer time.

SUMMARY OF THE INVENTION

The present invention has for its object to provide a novel and useful method for making a sharp and high definitive photographic record of a sound field within a short time period without being affected by noise.

According to the invention, a method of making a photograhpic record of a sound field comprises, scanning a sound field to be recorded by means of an acoustic-electric transducing means to derive a signal representing sound pressure at respective scanning points;

detecting said signal to produce an envelope signal;

sampling said envelope signal at a predetermined sampling frequency to produce a sample signal;

amplitude-modulating a carrier having a predetermined frequency with said sample signal to produce a modulated signal;

driving an electric-light transducing means for producing a light spot moving in synchronism with the movement of said acoustic-electric transducing means, with said modulated signal in such a manner that when an amplitude of the modulated signal exceeds a predetermined threshold level, said light spot is periodically turned on and off at a rate of said predetermined frequency of the carrier; and recording an image of a locus of the moving light spot on a photographic film.

The present invention also relates to an apparatus for carrying out the above mentioned method and has for its object to provide a novel and useful apparatus for forming a sharp photographic record representing characteristics of a sound field.

According to the invention, an apparatus for forming a photographic record of a sound field comprises, an acoustic-electric transducing means including a microphone for transducing a received sound pressure into an electric signal and a scanning mechanism for moving the microphone reciprocally to scan a sound field to be recorded;

means for detecting the electric signl to derive an envelope signal;

means for sampling the envelope signal supplied from the detecting means at a given sampling frequency to produce a sample signal;

means for generating a carrier having a predetermined frequency;

means for amplitude-modulating said carrier with said sample signal to generate a modulated signal;

electric-light transducing means for producing a light spot moving in synchronism with the movement of said acoustic-electric transducing means;

switching means connected between said modulating means and electric-light transducing means, said switching means being controlled by said modulated signal such that the light spot is turned on and off at a rate of said predetermined frequency of the carrier when the signal from the microphone exceeds a predetermined value; and means comprising a camera for taking a photograph of an image of a locus of the light spot to form a photographic record of the sound field.

BRIED DESCRIPTION OF THE DRAWINGS

FIGS. 4A to 4F show waveforms for explaining the operation of the apparatus shown in FIG. 2;

EXPLANATION OF THE PREFERRED EMBODIMENTS

Figure 2:
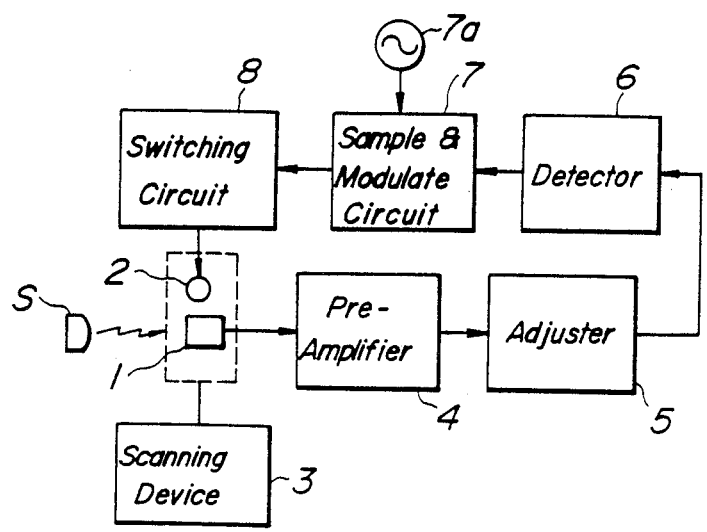
FIG. 2 is a block diagram illustrating an embodiment of the apparatus according to the invention.

FIG. 2 is a block diagram showing an embodiment of the apparatus for forming a photographic record of a sound field according to the invention. In the present embodiment, a distribution of sound pressure of a sound generated from a sound source S is to be recorded. The apparatus comprises an acoustic-electric transducing means including a microphone 1 and an electric-light transducing means including a light emitting diode 2. The microphone 1 and light emitting diode 2 are secured to a scanning arm of a scanning device 3 to scan a plane in a sound field to be recorded. An electric signal from the microphone 1 is supplied via a pre-amplifier 4 to an adjuster 5 for adjusting an amplitude of the electric signal in accordance with a predetermined sound pressure. The adjuster 5 comprises a variable attenuator for attenuating the amplitude of the electric signal in such a manner that an amplitude of the signal corresponding to the predetermined sound pressure is made equal to a turn-on threshold value of a switching circuit. An output signal from the adjuster 5 is supplied to a detector 6 to derive a direct current voltage level corresponding to an effective value of the alternating current output signal from the adjuster 5, i.e. an envelope signal of the output signal. Then, the direct current voltage signal is supplied to a sampling and amplitude-modulating circuit 7 as a modulating signal. To the circuit 7 is also supplied a carrier having a predetermined frequency from a local oscillator 7a. In the sampling and modulating circuit 7, the direct current voltage signal from the envelope detector 6 is sampled to produce a sample signal and then the carrier is modulated with the sample signal to derive a modulated signal.

As will be explained later, in the present embodiment, the sampling and modulating are carried out simultaneously, but it is also possible to effect the sampling and modulating successively. The modulated signal is then supplied to a switching circuit 8 as a control signal. In the switching circuit 8, every time the modulated signal exceeds the threshold level of the switching circuit, the switching circuit is made conductive. When the switching circuit 8 is made conductive, the light emitting diode 2 is turned on. Since, the modulated signal has the frequency of the carrier, the light emitting diode 2 is made turned on and off at a rate of this frequency as long as the output signal from the microphone is equal to or larger than the predetermined value corresponding to the predetermined sound pressure.

Figure 3:
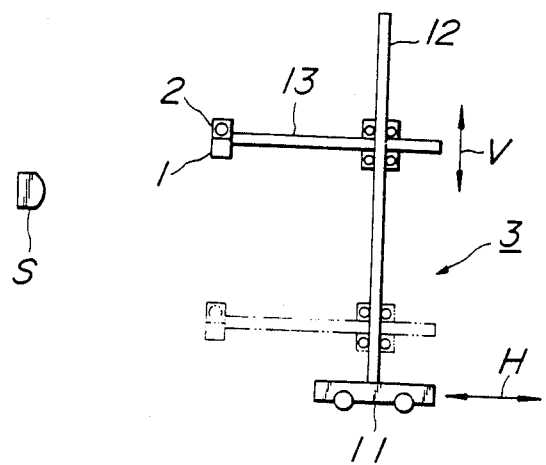
FIG. 3 is a side view of a scanning device provided in the apparatus shown in FIG. 2.

FIG. 3 is a side view of the scanning device 3. The scanning device 3 comprises a carriage 11 which can be moved forwardly and backwardly with respect to the sound source S as illustrated by an arrow H, a post 12 having one end secured to the carriage 11 and an arm 13 movably secured to the post 12. The microphone 1 and light emitting diode 2 are secured to one end of the arm 13, so that they are moved up and down as illustrated by an arrow V. Any noise produced by the movement of the carriage 11 and arm 13 is preferably made as small as possible. While the carriage 11 is moved horizontally in one direction at a constant speed, the arm 13 is reciprocally moved up and down at a speed higher than the carriage 11 to scan a plane in the sound field to be investigated by means of the microphone 1 and light emitting diode 2.

Figure 1:
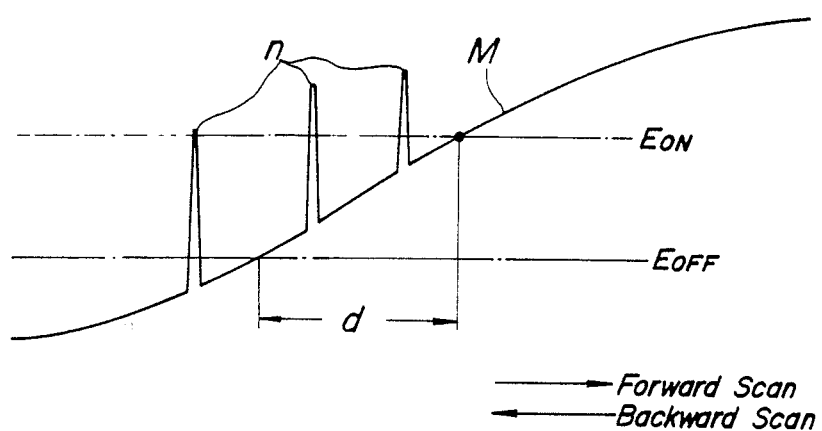
FIG. 1 is a waveform for explaining a hysterisis characteristic of a switching circuit.

Now the operation of the apparatus will be explained in detail also with reference to waveforms shown in FIGS. 4A to 4F. FIG. 4A shows the output signal $O_1$ supplied from the microphone 1 and amplified by the pre-amplifier 4. In FIG. 4A, a chain line P indicates the level of the predetermined sound pressure corresponding to a voltage $V_1$, and thus when the signal $O_1$ exceeds the level P, i.e. the voltage $V_1$, the light emitting diode 2 has to be turned on and off. The output signal $O_1$ is supplied to the adjuster 5 comprising the attenuator and is attenuated in such a manner that the voltage $V_1$ is decreased to the threshold level T of a voltage $V_2$ of the switching circuit 8 as illustrated in FIG. 4B. It should be noted that this threshold voltage $V_2$ corresponds to the turn-on voltage level $E_{ON}$ shown in FIG. 1. Then the output signal $O_2$ thus attenuated is supplied to the detector 6. FIG. 4C illustrate the output signal $O_3$ from the detector 6. In FIGS. 4C, 4D and 4E, the amplitude is exaggerated as compared with FIGS. 4A and 4B for the sake of clarity. Then the envelope signal $O_3$ thus detected is supplied to the sampling and modulting circuit 7 and is sampled as shown in FIG. 4D at a given sampling frequency to derive the sample signal $O_4$. Next, the sample signal $O_4$ is read out during a half of the sampling period. In this specification, this reading operation is also termed as the "modulating operation." That is to say, the carrier supplied from the oscillator 7a is amplitude-modulated with the sample signal $O_4$ to derive the modulated signal $O_5$ illustrated in FIG. 4E. In the present embodiment, the carrier is a rectangular wave having the frequency equal to the sampling frequency. However, it is a matter of course that the carrier may be a sinusoidal wave and may have a frequency higher than the sampling frequency. The modulated signal $O_5$ is then supplied to the switching circuit 8 as the control signal. When the signal $O_5$ exceeds the threshold level T of the voltage $V_2$, the switching circuit 8 is made conductive and the light emitting diode 2 is turned on. According to the invention, since the switching circuit 8 is controlled by the modulated signal $O_5$, for a time period during which the detector output signal $O_3$ exceeds the threshold level T, the switching circuit 8 is made periodically turned on and off at a rate of the carrier frequency, and therefore the light emitting diode 2 is also periodically turned on and off at the rate of the carrier frequency as illustrated in FIG. 4F. According to this invention, it is possible to compensate for the difference between the turn-on voltage level $E_{ON}$ and turn-off voltage level $E_{OFF}$, because the light emitting diode 2 is turned-on only when the detector output signal $O_3$ exceeds the threshold level T corresponding to the turn-on voltage level $E_{ON}$ of the switching circuit 8, but is never turned-on when the detector output signal $O_3$ has an amplitude between the turn-on voltage level $E_{ON}$ and turn-off voltage level $E_{OFF}$. Therefore, it is possible to record the sharp image of the locus of the light spot on the photographic film by taking a photograph of the scanning plane by means of a still camera whose shutter is maintained opened during the scanning.

Moreover, according to the invention, since the envelope signal from the detector is sampled, the influence of noise can be eliminated. Therefore, it is possible to obtain the photographic record representing accurately the distribution of sound pressure.

As explained above, according to the invention, the light emitting diode 2 is turned on and off at the rate of the carrier frequency, but the light spot is recorded on the photographic film as a continuous locus, because the scanning speed of the scanning device 2 is low as compared with the carrier frequency and further the scanning plane is recorded on the film with largely reduced size. In a preferable example, the arm 13 of the scanning device 3, i.e. the microphone 1 and light emitting diode 2 are moved at a speed of 0.1 to 2 meters per second and the carrier frequency is several to several hundreds Hz, preferably 10 to 100 Hz.

Figure 5:
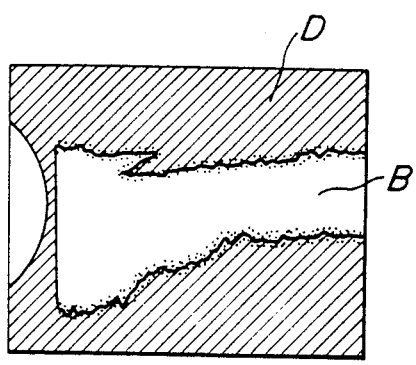
FIG. 5 is a photographic record taken by the apparatus of FIG. 2.

FIG. 5 shows an example of a photograph representing the distribution of the sound pressure taken by the above explained apparatus according to the invention. In this example, the light emitting diode 2 is turned on and off when the microphone 2 receives the sound pressure equal to or larger than the predetermined sound pressure. In FIG. 5, a hatched portion D represents an area in the sound field at which the sound pressure is lower than the predetermined sound pressure and a bright portion B denotes an area where the sound pressure exceeds the predetermined value. Therefore, a boundary between the dark and bright portions represents the distribution of the predetermined sound pressure. Therefore, when a number of recording operations are carried out each time the attenuation factor in the adjuster 5 is changed progressively, to form a number of photographs and then these photographs are superimposed upon each other, it is possible to obtain a contour diagram of equi-sound pressure.

Figure 6:
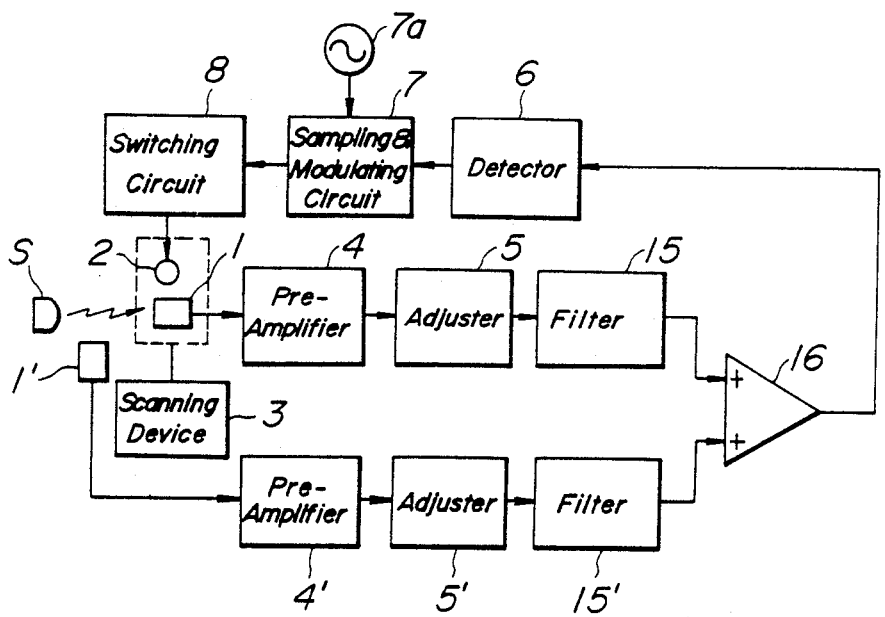
FIG. 6 is a block diagram depicting another embodiment of the apparatus according to the invention.

FIG. 6 is a block diagram showing another embodiment of the apparatus according to the invention. In the present embodiment, portions similar to those shown in FIG. 2 are denoted by the same reference numerals used in FIG. 2. In order to form a photographic record representing a spread of acoustic wave generated from a sound source S and propagating in a sound field, there are provided two microphones 1 and 1', one microphone 1 being secured to a scanning device 3 together with a light emitting diode 2 to scan a plane in the sound field, and the other microphone 1' being fixed at a suitable position in the sound field.

Figure 7:
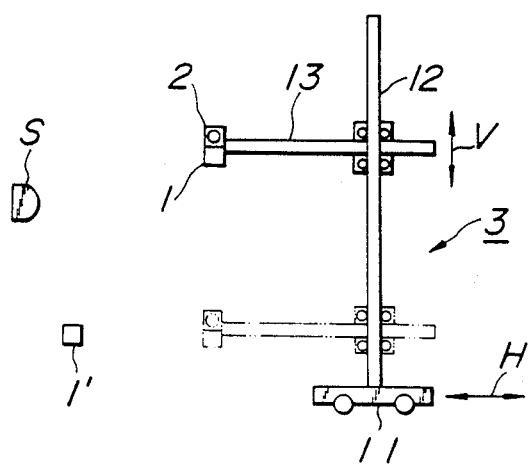
FIG. 7 is a side view showing a scanning device of the apparatus shown in FIG. 6.

FIG. 7 illustrates the arrangement of the microphones 1 and 1' with respect to the sound source S. The microphone 1 and light emitting diode 2 are secured to an arm 13 which is movable up and down as shown by an arrow V along a post 12 secured to a carriage 11 which is moved horizontally as shown by an arrow H. The output signals from the microphones 1 and 1' are supplied to pre-amplifiers 4 and 4', adjusters 5 and 5' and filters 15 and 15', respectively. In the filters 15 and 15', only components having a desired frequency are derived. If the sound source S generates the sound having only the desired frequency, the filters 15 and 15' may be deleted. The output signals from the filters 15 and 15' are summed up by a summing circuit 16 and a sum signal is then supplied to a detector 6 and a sampling and modulting circuit 7. In the circuit 7, the detector output signal is first sampled and held to produce a sample signal and then a carrier generated from a carrier oscillator 7a is amplitude-modulated with the sample signal to produce a modulated signal. The modulated signal is then supplied to a switching circuit 8 as a control signal. Also in this embodiment, the switching circuit 8 is made periodically conductive, and the light emitting diode 2 is turned on and off at a rate of the frequency of carrier.

A sound wave generated from the sound source S arrives at the microphones 1 and 1' at different instances so that the output signals supplied from the microphones 1 to 1' have a phase difference. This phase difference is determined by distances from the sound source S to the microphones 1 and 1', and therefore, when the microphone 1 is moved in the plane in the sound field to be recorded, the sum signal from the summing circuit 16 is changed along an equiphase surface of sound wave and when the sum signal exceeds the predetermined sound pressure, the light emitting diode is turned on and off. Therefore, the distribution of the equiphase surface of the sound wave having the desired frequency, i.e. the spread of the sound wave surface of the sound having a pressure equal to and higher than the predetermined sound pressure can be detected. While the microphone 1 and light emitting diode 2 scan the plane in the sound field, a shutter of a still camera is remained opened to record the locus of the light emitting diode 2 on a photographic film. Then, the photographic record representing the spread of the sound wave having the predetermined sound pressure and the desired frequency can be obtained.

Figure 8:
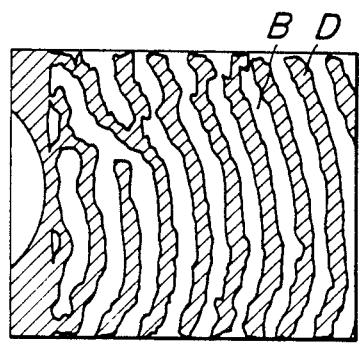
FIG. 8 is a photographic record formed by the apparatus illustrated in FIG. 6.

FIG. 8 illustrates an exmaple of the photographic record obtained by the apparatus shown in FIGS. 6 and 7. In this record, a bright portion B represents an area in which the sound wave is compressed and a dark portion D denotes an area in which the sound wave is not compressed.

The present invention is not limited to the embodiments explained above, but many modifications and alternations could be conceived by those skilled in the art within the scope of the invention. For instance, as the scanning device for the microphone and light source, use may be made of various types of scanning devices. Further, it is not always necessary to secure the light emitting diode to the scanning device to which the microphone is also secured. For instance, the light emitting diode may be moved to another place than the sound field in synchronism with the movement of the microphone. For instance, the light spot may be generated by an oscilloscope arranged outside the sound field to be recorded. In such a case, a screen of the oscilloscope may be photographed by a camera. In the above embodiments, the output signal from the detector is sampled and at the same time the carrier is modulated by the sample signal, but the sampling and modulating may be effected successively by separate circuits. In such a case, instead of attenuating the output signal from the microphone, the modulated signal may be compared with a threshold level corresponding to a predetermined sound pressure. Moreover, the sampling frequency and the carrier frequency may be different from each other. In the embodiment shown in FIGS. 6 and 7, only the photograph of the spread of the sound wave is recorded. But the output signal from the microphone 1' may be separately processed to obtain the photographic record representing the distribution of sound pressure. In such a case, both the spread of the sound wave and the distribution of sound pressure may be formed by means of the same apparatus.

According to the invention, since the electric-light transducing means is turned on and off as long as the detector output signal is equal to or larger than the predetermined level, it is possible to form the sharp photographic image having the high resolution. Further, since the microphone can be moved reciprocally in a continuous manner, the photographic record can be formed within a short time without requiring a complicated and expensive scanning device. Moreover, since the detector output signal is sampled, the influence of noise can be effectively removed and the accurate photographic record can be formed.

What is claimed is:

1. A method of making a photographic record of a sound field comprising
    scanning a sound field to be recorded by means of an acoustic-electric transducing means to derive a signal representing sound pressure at respective scanning points;
    detecting said signal to produce an envelope signal;
    sampling said envelope signal at a predetermined sampling frequency to produce a sample signal;
    amplitude-modulating a carrier having a predetermined frequency with said sample signal to produce a modulated signal;
    driving an electric-light transducing means for producing a light spot moving in synchronism with the movement of said acoustic-electric converting means, with said modulated signal in such a manner that when an amplitude of the modulated signal exceeds a predetermined threshold level, said light spot is periodically turned on and off at a rate of said predetermined frequency of the carrier; and
    recording an image of a locus of the moving light spot on a photographic film.

2. A method according to claim 1, wherein said acoustic-electric transducing means and electric-light transducing means are moved simultaneously in a reciprocal manner by means of a common scanning device.

3. A method according to claim 2, wherein said acoustic-electric transducing means and electric-light transducing means are moved in the sound field at a speed of 0.1 to 2 meters per second.

4. A method according to claim 1, wherein sampling and modulating are effected simultaneously.

5. A method according to claim 1, wherein said modulating is carried out with the carrier having the frequency equal to the sampling frequency.

6. A method according to claim 5, wherein said carrier frequency is selected from a frequency range from several to several hundred Hz, preferably 10 to 100 Hz.

7. A method according to claim 4, further comprising
    adjusting an amplitude of the envelope signal in such a manner that an amplitude of the envelope signal corresponding to a predetermined sound pressure is translated into a modulated signal having an amplitude equal to said predetermined threshold level.

8. A method according to claim 1, further comprising
    arranging an additional microphone at a fixed position to derive an additional signal representing sound pressure at the fixed position;
    summing the additional signal from the additional microphone with the signal from the acoustic-electric transducing means to produce a sum signal; and
    detecting the sum signal to derive an envelope signal of the sum signal;
    whereby a photographic record representing the distribution of equiphase surface wave is formed.

9. An apparatus for forming a photographic record of a sound field comprising
    an acoustic-electric transducing means including a microphone for transducing a received sound pressure into an electric signal and a scanning mechanism for moving the microphone reciprocally to scan a sound field to be recorded;
    means for detecting the electric signal supplied from the micrphone to derive an envelope signal;
    means for sampling the envelope signal supplied from the detecting means at a given sampling frequency to produce a sample signal;
    means for generating a carrier having a predetermined frequency;
    means for amplitude-modulating said carrier with said sample signal to generate a modulated signal;
    electric-light transducing means for producing a light spot moving in synchronism with the movement of said acoustic-electric transducing means;
    switching means connected between said modulating means and electric-light transducing means, said switching means being controlled by said modulated signal such that the light spot is turned on and off at a rate of said predetermined frequency of the carrier when the signal from the microphone exceeds a predetermined value; and
    means comprises a camera for taking a photograph of an image of a locus of the light spot to form a photographic record of the sound field.

10. An apparatus according to claim 9, wherein said electric-light transducing means comprises a light source secured to the scanning mechanism of the acoustic-electric transducing means.

11. An apparatus according to claim 9, further comprising
    means for adjusting an amplitude of the electric signal in such a manner that an amplitude of the signal corresponding to the predetermined value is made equal to a threshold level of the switching means.

12. An apparatus according to claim 11, wherein said sampling and modulating are effected at the same frequency.

13. An apparatus according to claim 9, wherein said acoustic-electric transducing means further comprises a second microphone arranged at a fixed position in the sound field to produce a secnd electric signal, and the apparatus further comprising a summing circuit for summing said second electric signal with the first electric signal from the ffirst microphone to derive a sum signal which is to be supplied to the detecting means.

14. An apparatus according to claim 13, further comprising first and second filters connected between the first and second microphones and the summing circuit, respectively for deriving given frequency components in the first and second electric signals.

* * * * *